US008687071B2

(12) United States Patent  (10) Patent No.: US 8,687,071 B2
Yamaji  (45) Date of Patent: Apr. 1, 2014

(54) COMPOSITE IMAGE CREATING METHOD AS WELL AS PROGRAM, RECORDING MEDIUM, AND INFORMATION PROCESSING APPARATUS FOR THE METHOD

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 383 days.

(21) Appl. No.: 12/891,247

(22) Filed: Sep. 27, 2010

(65) Prior Publication Data

US 2011/0074977 A1  Mar. 31, 2011

(30) Foreign Application Priority Data

Sep. 30, 2009 (JP) ................................ 2009-227224

(51) Int. Cl.
*H04N 5/225* (2006.01)
(52) U.S. Cl.
USPC ...................................... 348/218.1; 382/284
(58) Field of Classification Search
USPC ................. 348/218.1, 239; 382/284
See application file for complete search history.

(56) References Cited

U.S. PATENT DOCUMENTS

| 6,148,150 | A | 11/2000 | Yajima et al. | |
|---|---|---|---|---|
| 8,305,457 | B2 * | 11/2012 | Tsurumi | 348/222.1 |
| 2004/0165000 | A1 | 8/2004 | Nagahashi et al. | |
| 2007/0237423 | A1 * | 10/2007 | Tico et al. | 382/284 |
| 2010/0073519 | A1 * | 3/2010 | Onoe et al. | 348/231.99 |

FOREIGN PATENT DOCUMENTS

| CN | 200810099346 | 11/2008 |
|---|---|---|
| JP | 2000-039641 | 2/2000 |
| JP | 2001-142453 | 5/2001 |
| JP | 2003-198902 | 7/2003 |
| JP | 2004-128683 | 4/2004 |
| JP | 2004-199248 | 7/2004 |
| JP | 2005-252739 | 9/2005 |
| JP | 2007-267008 | 10/2007 |
| JP | 2008-289095 | 11/2008 |
| KR | 20070097273 | 10/2007 |
| WO | WO 2009081806 A1 * | 7/2009 |

OTHER PUBLICATIONS

Notification of Reasons for Rejection issued Jun. 10, 2013 by the Japanese Patent Office in Japanese Patent Application No. 2009-227224 with partial translation, 4 pages.

* cited by examiner

*Primary Examiner* — Nelson D. Hernández Hernández
(74) *Attorney, Agent, or Firm* — Young & Thompson (57) ABSTRACT

In an aspect of the composite image creating method according to the present invention, an information processing apparatus executes the steps of: inputting material candidate images which are images composed of frames of a moving image and/or a plurality of still images that were taken by an image-taking apparatus; detecting a movement of the image-taking apparatus at image-taking time points of all or some of the material candidate images or analysis time points that are time points in a neighborhood of the image-taking time points; determining a condition for generating a composite image from among the material candidate images based on the movement of the image-taking apparatus detected; and creating a composite image based on the material candidate images and on the condition determined.

6 Claims, 6 Drawing Sheets

FIG.5A
ENHANCED

R

FIG.5B
NORMAL

FIG.6A
ENHANCED

FIG.6B
NORMAL

COMPOSITE IMAGE CREATING METHOD AS WELL AS PROGRAM, RECORDING MEDIUM, AND INFORMATION PROCESSING APPARATUS FOR THE METHOD

BACKGROUND OF THE INVENTION

1. Field of the Invention

The present invention relates to creation of layout of a photobook utilizing composite images.

2. Description of the Related Art

An invention according to Japanese Patent Application Laid-Open No. 2004-128683 records movement information for a digital camera during image taking as measured by various types of sensors, such as a three-dimensional gyroscope, zoom actuator operation information, three-dimensional acceleration measuring unit, in a memory card or internal memory such that the movement information is assigned to image data on a per-frame basis. Then, the movement information is extracted by a splitting device from the recorded image data with movement information assigned, and based on the movement information extracted, a direction or distance of movement of the digital camera during image taking is calculated by a computation device, and neighboring subject frames are extracted by an image editing device to create a composite image.

An image layout apparatus according to an invention described in Japanese Patent Application Laid-Open No. 2004-199248 includes a target-area calculating device that calculates a target area in image A which is to be superimposed behind another image B, and a layout device that carries out layout while avoiding overlap of the target area of image A and the image B.

Japanese Patent Application Laid-Open Nos. 2005-252739 and 2007-267008 are examples of conventional art for creating a composite image from still and moving images, respectively.

Japanese Patent Application Laid-Open No. 2008-289095 shows an example of detecting the moving speed and direction (a movement vector) of a camera based on image data.

Japanese Patent Application Laid-Open No. 2000-039641 shows an example of a mechanism for detecting the moving speeds in pan (i.e., horizontal) and tilt (i.e., vertical) directions of a camera on a panhead.

SUMMARY OF THE INVENTION

A generally known method of creating a composite image is to connect or superimpose multiple images (still images or frames of a moving image) containing a subject at least a portion of which overlaps among the images such that the overlapping portions of the subject overlap each other.

Figure 8:
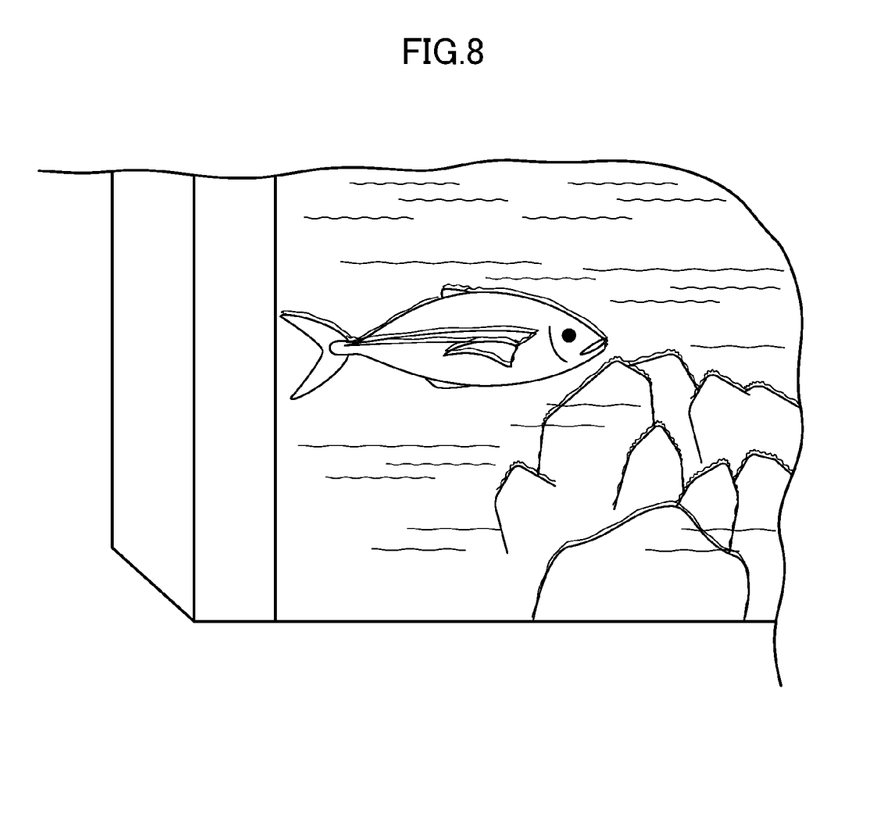
FIG. 8 shows an illustrative panorama image which is based on a moving image taken with the camera being stationary.

In general, a moving image suited for this way of creating a composite image is a moving image that was taken with the camera moved in a fixed direction. An effective composite image cannot be created from a moving image that is produced by taking an image of the same subject without moving the camera (see FIG. 8).

An object of the present invention is to collect materials for an effective composite image using camera movement information.

The present invention provides a composite image creating method for causing an information processing apparatus to execute the steps of: inputting material candidate images which are images composed of frames of a moving image and/or a plurality of still images that were taken by an image-taking apparatus; detecting a movement of the image-taking apparatus at image-taking time points of all or some of the material candidate images or analysis time points that are time points in a neighborhood of the image-taking time points; determining a condition for generating a composite image from among the material candidate images based on the movement of the image-taking apparatus detected; and creating a composite image based on the material candidate images and on the condition determined.

A composite image as called herein typically refers to a still image that is created by joining frames of a moving image or multiple still images that capture a subject at a wide angle and continuously such that the subject is continuous, but may be a still image that is produced by joining images in a manner that the entire portion or a portion of the subject is not continuous.

A time point in the neighborhood of the image-taking time point refers to a time point closest to the image-taking time point among certain time points that segment a period of image taking (from the start of image taking to its end). Typically, a time period from the image-taking start time to the image-taking end time is segmented at time intervals of a certain length, and a segmenting time point in a time interval closest to a image-taking time point is defined as an analysis time point.

Preferably, the image processing apparatus executes a step of excluding an image that was taken at an analysis time point at which the movement of the image-taking apparatus did not meet a predetermined criterion from material candidate images.

Preferably, the information processing apparatus executes the steps of: detecting a moving speed of the image-taking apparatus at each analysis time point; determining a number of material candidate images to be extracted per unit time in the neighborhood of the each analysis time point based on the detected moving speed of the image-taking apparatus at each analysis time point; extracting material candidate images as many as the number of images to be extracted per unit time in the neighborhood of the each analysis time point; and creating a composite image based on the material candidate images extracted.

Preferably, the information processing apparatus executes the steps of: detecting a moving speed and/or a moving direction of the image-taking apparatus at the image-taking time point of each of the material candidate images; determining a material candidate image that is to be visually enhanced among the material candidate images based on the moving speed and/or the moving direction; and creating a composite image in which a subject contained in the material candidate image to be visually enhanced is visually enhanced based on the material candidate image.

The present invention also provides a program for causing an information processing apparatus to execute the composite image creating method, a non-transitory recording medium in which computer readable code of the program is stored, and an information processing apparatus that executes the composite image creating method.

The present invention enables creation of an attractive composite image that reflects movements (i.e., moving speed and direction) of a camera.

DETAILED DESCRIPTION OF THE PREFERRED EMBODIMENTS

Figure 1:
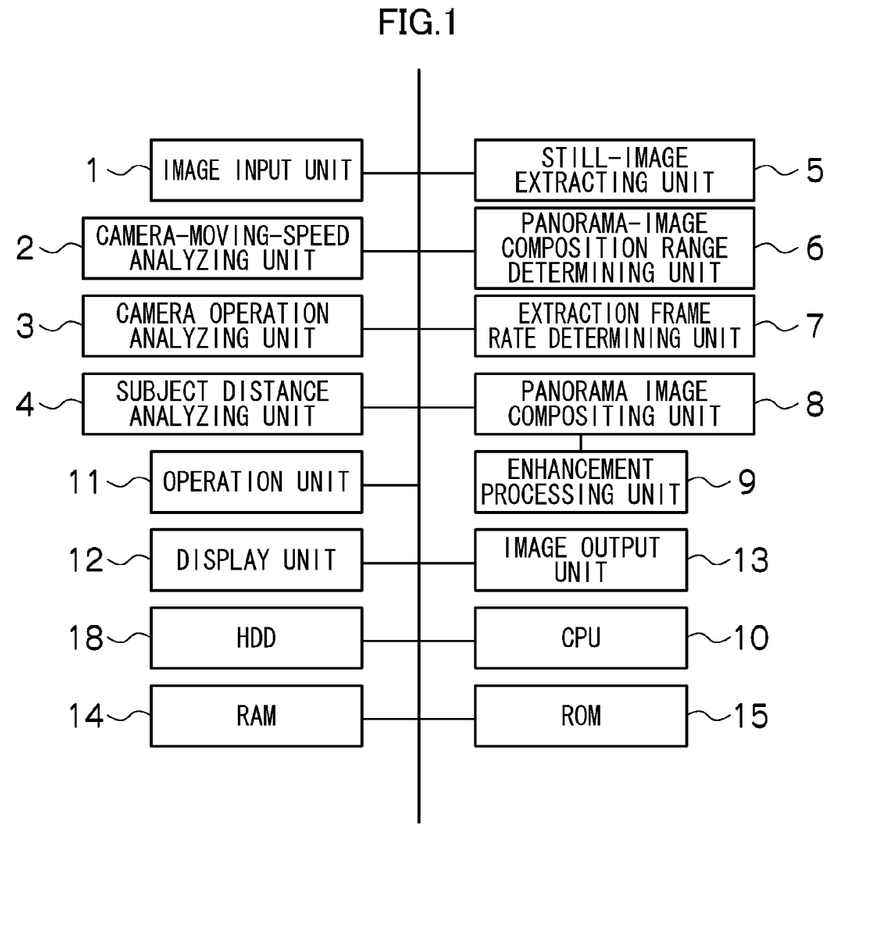
FIG. 1 is a block diagram showing a general configuration of a panorama image creating apparatus.

FIG. 1 is a block diagram showing a general configuration of a panorama image creating apparatus 100 to which the present invention is applied. The panorama image creating apparatus 100 reads in images (which may be either multiple still image data or frames of a moving image which are still images generated by capturing the moving image) for use as materials of a panorama image via an image input unit 1 from, for example, various types of recording media like a CD and DVD or a storage medium such as a memory card, or from a generic interface for peripheral device connection, such as a USB port connected with a camera, or from a network such as the Internet or a LAN, and uses the images as materials to create a panorama image (an image created by connecting or superimposing multiple images containing a subject at least a portion of which overlaps among the images so that the overlapping portion of the subject overlaps one another). As an example, moving-image data generated under compression recording standards such as Motion JPEG and MPEG4 are available. As an example, still-image data generated under image file formats such as JPEG, TIFF, and EXIF, which are standards for digital still cameras, are available.

A camera mentioned herein is equipped with an optical unit including a focus lens, a zoom lens, an aperture and the like; an image pick-up device such as a CCD and CMOS for photoelectric conversion of a subject image formed via the optical unit into an image signal; an A/D converter which converts the image signal from the image pick-up device to digital image data; an image processing circuit that applies processing for image-quality correction, such as gamma correction, sharpness correction, contrast correction, and color correction, to the image data from the A/D converter; an image recording circuit that converts the image data processed in the image processing circuit to a predetermined saving format (e.g., MPEG) and records the data in a recording medium, such as a memory card, and so forth. The camera may be a known digital still and/or video camera capable of taking still and/or moving images. The camera also records image-taking conditions at the time of taking material images (such as compression rate of moving-image frames or still images, zoom factor, aperture, focal distance, GPS position information, and frame rate of a moving image) as supplementary information on the moving image.

Material candidate images are a series of still images or moving-image frames that have overlapping portions with which a panorama image can be created, such as continuously shot images. For the sake of simplicity, the following descriptions discuss material candidate images as moving-image frames, but they may be still images. Alternatively, material candidate images may be mixture of moving-image frames and still images.

The system configuration of FIG. 1 is an example and the present invention can be practiced with any information terminal (e.g., a PC, a printing terminal at a store, a PDA, or a mobile telephone) that has an equivalent configuration. In addition, the blocks shown in the figure need not be necessarily integrated in a single electronic device, but the present invention can be practiced so long as the individual blocks are parts of separate electronic devices and information transmission and reception between the electronic devices is possible through some kind of a communication device, such as a network: practice of the present invention is not dependent on a particular device configuration.

The panorama image creating apparatus 100 is operated through an operation unit 11 that includes various types of operation devices, e.g., a touch screen and a pointing device capable of directing movement of a pointer (or a cursor), such as a mouse, a touchpad, and a trackball. A touch screen is overlaid on a display unit 12, which may include a liquid crystal display or the like, and by pressing a button-displaying portion on the display unit 12, a user can enter a character corresponding to the portion or activate various functions.

To the panorama image creating apparatus 100, an image output unit 13 is connected that prints specified still images as a panorama image created by a panorama image compositing unit 8 on a paper sheet, which is formed of a paper medium such as plain or photographic paper. Alternatively, still images arranged in a certain layout may be output to the display unit 12, a recording medium, or a personal computer connected via the Internet in the form of an electronic medium such as PDF from Adobe Systems.

An HDD 18 has stored therein one or more still image data, moving-image frames, and panorama images as primary materials of image prints as well as decoration image data (graphics) to be combined with the materials when an image print is generated. The graphics include still images, character data representing letters or characters to be inserted into an image (Chinese characters, katakana, hiragana, alphabets, symbols, pictograms, and other readable and meaningful signs as well as any combination thereof, which also applies to the following descriptions), graphic data on text boxes, speech bubbles, billboards, and notice boards to contain such letters and characters, other objects suitable for arranging letters on, mask images to cover an unnecessary portion of a target image, illustrations, clip arts, and so on. Such decoration images give color to a photobook by decorating the background of still images as primary materials of a photobook or adding an eye-catching decoration.

The panorama image compositing unit 8 generates a panorama image from material images determined by a panorama-image composition-range determining unit 6 among material candidate images input from the image input unit 1. A specific way of generating a panorama image may be similar to a conventional method. That is to say, the panorama image compositing unit 8 generates a panorama image by joining multiple material images such that overlapping areas are overlaid on each other. Multiple moving-image frames or still images for use as materials of a panorama image are a series of images containing overlapping portions of a subject from which a panorama image can be generated, such as continuously shot images, and may be taken in an arbitrary manner.

A CPU 10 controls the entire panorama image creating apparatus 100 by executing a program stored in the HDD 18.

A camera-moving-speed analyzing unit 2, a camera operation analyzing unit 3, a subject distance analyzing unit 4, a still-image extracting unit 5, a panorama-image composition-range determining unit 6, an extraction frame-rate determining unit 7, a panorama image compositing unit 8, and an enhancement processing unit 9 are co-processors and are responsible for their respective dedicated processes to assist processing operations of the CPU 10. A RAM 14 stores data necessary for processing by the CPU 10 and the co-processors.

The camera-moving-speed analyzing unit 2 analyzes the moving speed of the camera at the time of taking a series of material images which are input from the image input unit 1, based on the material images.

Speed analysis can be performed in two ways: by image analysis on material candidate images and based on camera movement information provided by a sensor in the main body of the camera.

To calculate the speed by image analysis, the camera-moving-speed analyzing unit 1 plots a locus of a representative position in individual material candidate images (e.g., the center of a certain subject) on an X-Y coordinate plane and calculates the moving speed of the camera during taking of the material candidate images from a shift or distance between the representative positions of the material candidate images and from an image-taking interval between the material candidate images. The image-taking interval is frame rate when the material candidate images are a moving image and is the difference in image-taking date/time information between two different material candidate images when the material candidate images are still images.

Camera movement information acquired by a camera sensor refers to information on the angular velocity and/or acceleration of the camera's pan/tilt operations during taking of each material candidate image as detected by a shake detection sensor (e.g., an angular velocity sensor, an acceleration sensor) contained in the camera. The information can be obtained from the image input unit 1 together with each material candidate image as its supplementary information (header information, tag information, and meta-information). Such angular velocity and acceleration are produced by a photographer's intentional actions.

The camera-moving-speed analyzing unit 2 calculates the moving speed of the camera according to camera movement information. The moving speed and direction of the camera can also be detected with a sensor included in a camera accessory (e.g., a panhead or a GPS receiver) instead of in the camera itself, in which case the camera-moving-speed analyzing unit 2 may recognize such information as movement information for the camera as it is.

Alternatively, when focal distance information for the camera is available from supplementary information such as a tag, the subject distance analyzing unit 4 calculates the distance from the camera to the subject based on the focal distance information. The camera-moving-speed analyzing unit 2 is able to calculate the speed of the camera as seen from the subject based on an angular velocity derived by an angular velocity sensor and the distance to the subject calculated by the subject distance analyzing unit 4.

Alternatively, the camera-moving-speed analyzing unit 2 may calculate the moving speed of the camera using the techniques disclosed in Patent Documents 5 and 6. In short, a specific method of calculating camera speed to be adopted by the camera-moving-speed analyzing unit 2 may be arbitrarily selected.

Figure 2:
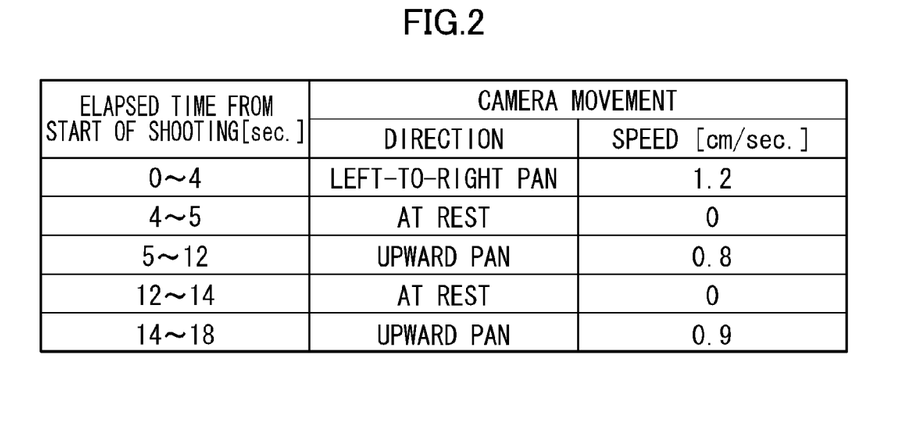
FIG. 2 shows an example of camera moving speed.

FIG. 2 shows an example of camera moving speeds calculated by the camera-moving-speed analyzing unit 2. The camera moving speeds are not limited to the illustrated ones.

The panorama-image composition-range determining unit 6 excludes material candidate images that were taken when the camera's moving speed has fallen below a predetermined threshold from material images, and designates the remaining material candidate images as material images. When a certain number of material candidate images have been excluded from material images, e.g., when all the material candidate images have been excluded from material images, the panorama-image composition-range determining unit 6 provides an alert message like "This moving image is not fit for creating a panorama image. Will you like to continue processing?" by displaying text on the display unit 12 or emitting sound from a speaker. And only when an instruction for continuing processing is input from the operation unit 11, the panorama image compositing unit 8 generates a panorama image from the material images.

The predetermined threshold for reference by the panorama-image composition-range determining unit 6 may be stored in a non-volatile storage medium such as a ROM 15 in a non-rewritable manner or may be a value arbitrarily set from the operation unit 11.

In a typical case, the predetermined threshold is 0. In this case, among material candidate images, the panorama-image composition-range determining unit 6 excludes material candidate images that were taken when the camera was at rest from material images, and designates the remaining material candidate images as material images.

The panorama image compositing unit 8 creates a panorama image based on the material images designated by the panorama-image composition-range determining unit 6. When such camera speeds as shown in FIG. 2 have been identified, the panorama image compositing unit 8 can generate three panorama images from moving-image frame groups representing material images, i.e., three moving-image-frame groups, 0 to 4, 5 to 12, and 14 to 18 seconds from the start of image taking. Alternatively, the panorama image compositing unit 8 may generate one panorama image from all the three material image groups. How many groups represents a unit for panorama generation by the panorama image compositing unit 8 may be determined according to a selecting operation from the operation unit 11.

The panorama-image composition-range determining unit 6 determines a frame interval for use in generation of a panorama image based on the camera speed during taking of material images which is detected by the camera-moving-speed analyzing unit 2.

Figure 3:
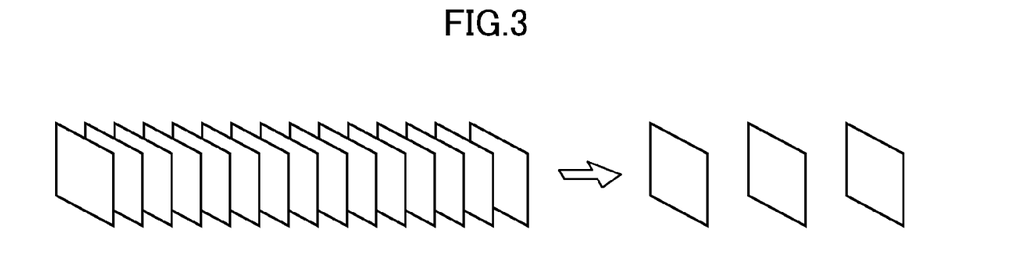
FIG. 3 illustrates extraction of moving-image frames for material candidates.

When generating a panorama image from a moving image, the panorama image compositing unit 8 preferably extracts certain moving-image frames (such as frames that were taken at certain intervals) from the moving image and composites the frames because use of all moving-image frames takes time for processing (see FIG. 3).

However, if moving-image frames are extracted at wide intervals, moving-image frames necessary for creating a panorama could not be extracted when the speed, i.e., the amount of movement per unit time, of the camera is large, in which case a correct panorama image with a subject being continuous cannot be generated.

Figure 4:
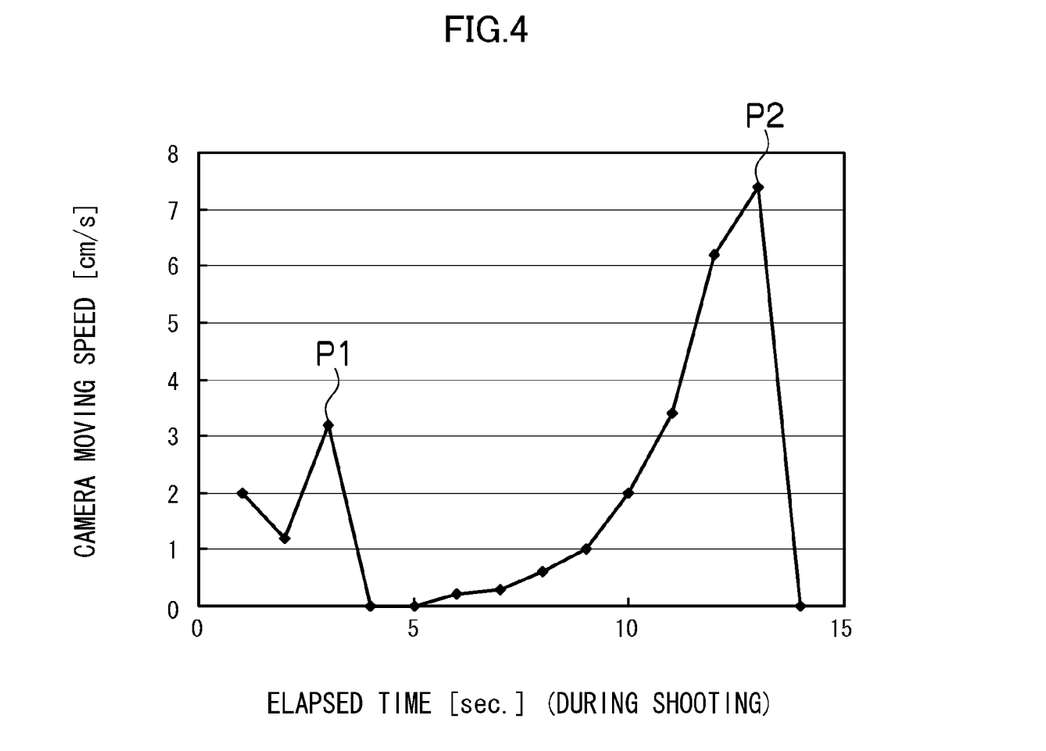
FIG. 4 shows an example of camera moving speed while taking a moving image.

Thus, the panorama-image composition-range determining unit 6 determines the number of moving-image frames to be extracted in the neighborhood of each analysis time point on camera moving speed according to the camera moving speed detected at that analysis time point. For example, when the moving speed of the camera at a point of analysis P1 is 4 centimeters/s or higher as illustrated in FIG. 4, the panorama-image composition-range determining unit 6 sets the number of frames to be extracted from material candidate images that ware taken in the neighborhood of the analysis time point P1 to 15 frames/s. Or when the moving speed of the camera at an analysis time point P2 is below 4 centimeters/s, the panorama-image composition-range determining unit 6 sets the number of frames to be extracted from material candidate images that were taken in the neighborhood of the analysis time point P2 to 5 frames/s.

The panorama-image composition-range determining unit 6 extracts the set number of frames of material candidate images that were taken in the neighborhood of the analysis time point in question, and designates those material candidate images as material images. The panorama image compositing unit 8 creates a panorama image based on the material images. By doing so, even if the camera made an instantaneous and quick movement while taking a moving image (e.g., time points P1 and P2 in FIG. 4), material images required for generating a panorama image that contains a subject that was taken at that time can be secured, which can prevent partial lack of the panorama image.

The camera operation analyzing unit 3 detects the moving direction of the camera at the time of taking each material candidate image. Like speed analysis, moving direction can be analyzed in two ways: by image analysis or based on camera movement information provided by a sensor in the main body of the camera. Thus, the camera-moving-speed analyzing unit 2 and the camera operation analyzing unit 3 may be integrated into a common unit.

The enhancement processing unit 9 controls the panorama image compositing unit 8 to generate a panorama image whose portion is enhanced based on the speed detected by the camera-moving-speed analyzing unit 2 and/or the camera's moving direction detected by the camera operation analyzing unit 3, from material images (which may or may not include material candidate images excluded from material images).

Figure 5A:
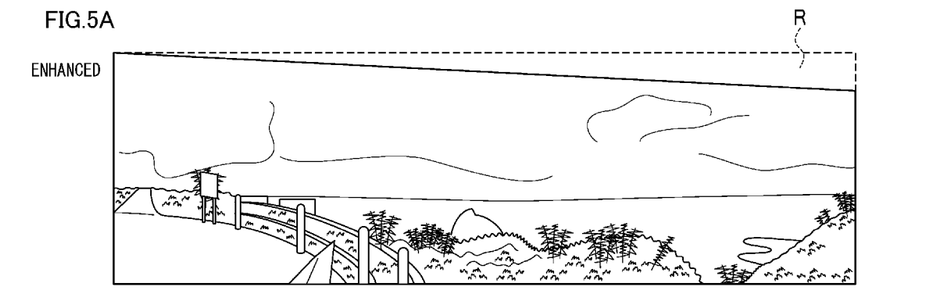
FIGS. 5A and 5B show an example of a panorama image with a portion thereof enhanced.
Figure 5B:
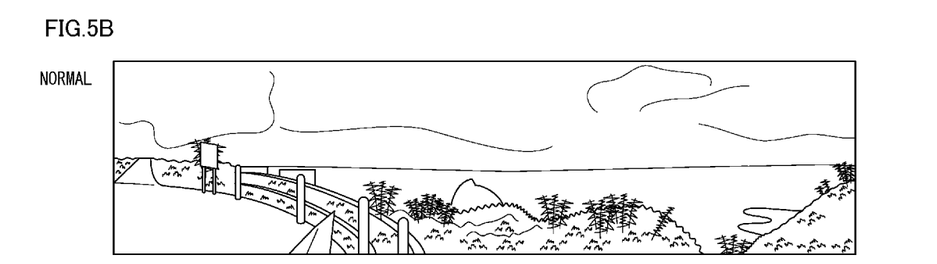

As an example, suppose that the moving direction of the camera detected by the camera operation analyzing unit 3 is right to left horizontally. In this case, the enhancement processing unit 9 controls the panorama image compositing unit 8 to create a panorama image such that an upper slope (or protrusion) of the panorama image gradually ascends toward the left, which is the end point of the moving direction of the camera, as depicted in FIG. 5A. In practice, the panorama image compositing unit 8 can create such a panorama image as shown in FIG. 5A by clipping a partial region R such that the upper portion of a normal rectangular panorama image created as shown in FIG. 5B forms a slope.

The angle of the slope may be varied as a function of the speed detected by the camera-moving-speed analyzing unit 2. For example, a panorama image having a steeper slope as the speed increases may be generated.

The direction and extent of the slope are not limited to the ones depicted. For example, when the moving direction of the camera is from right to left, from bottom to top, or from top to bottom, the direction in which the protrusion ascends may be toward right, top, or bottom, respectively. Also, multiple portions may be enhanced, instead of one.

Figure 6A:
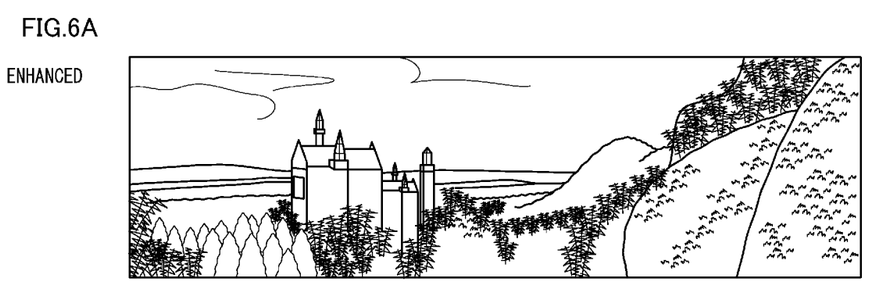
FIGS. 6A and 6B show an example of a panorama image with a portion thereof enhanced.
Figure 6B:
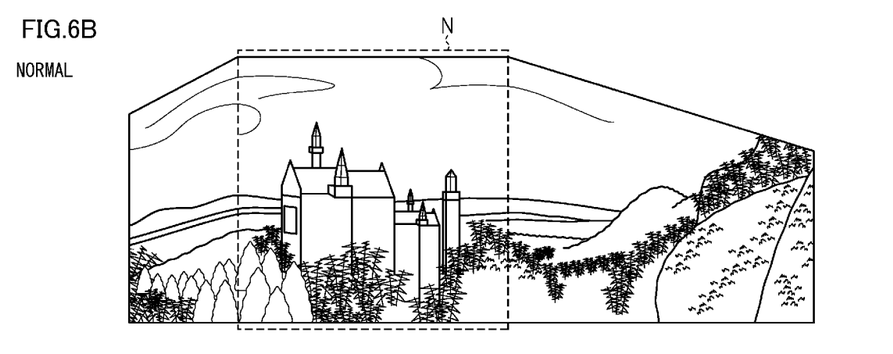

Alternatively, suppose that the moving direction of the camera detected by the camera operation analyzing unit 3 is right to left horizontally and the speed at the time of taking material candidate images containing a particular subject, e.g., a castle as shown in FIG. 6A, is slower than the speed at the time of taking material candidate images having other subjects, among material candidate images analyzed by the camera-moving-speed analyzing unit 2, for example. In this case, as illustrated in FIG. 6B, the enhancement processing unit 9 controls the panorama image compositing unit 8 to create a panorama image so that a peripheral area of the particular subject is visually enhanced. Examples of visual enhancement include increase in scaling factor or resolution of the region, expansion of the region in a certain direction (vertical or horizontal), increase in brightness of the region, decrease in brightness of other regions than the region of interest, and image processing equivalent to dodging. In the course of processing, image processing for smoothing a variation in color signal at the boundary between the enhanced portion and a non-enhanced portion may be applied so that the difference between the enhanced portion and the non-enhanced portion is not conspicuous. A subject to which the photographer pays attention during taking of a moving image with a camera is likely to be taken in a close-to-stationary state, and because such a subject is emphasized in a panorama image, a viewer of the panorama image can see to which subject the photographer paid attention.

Figure 7:
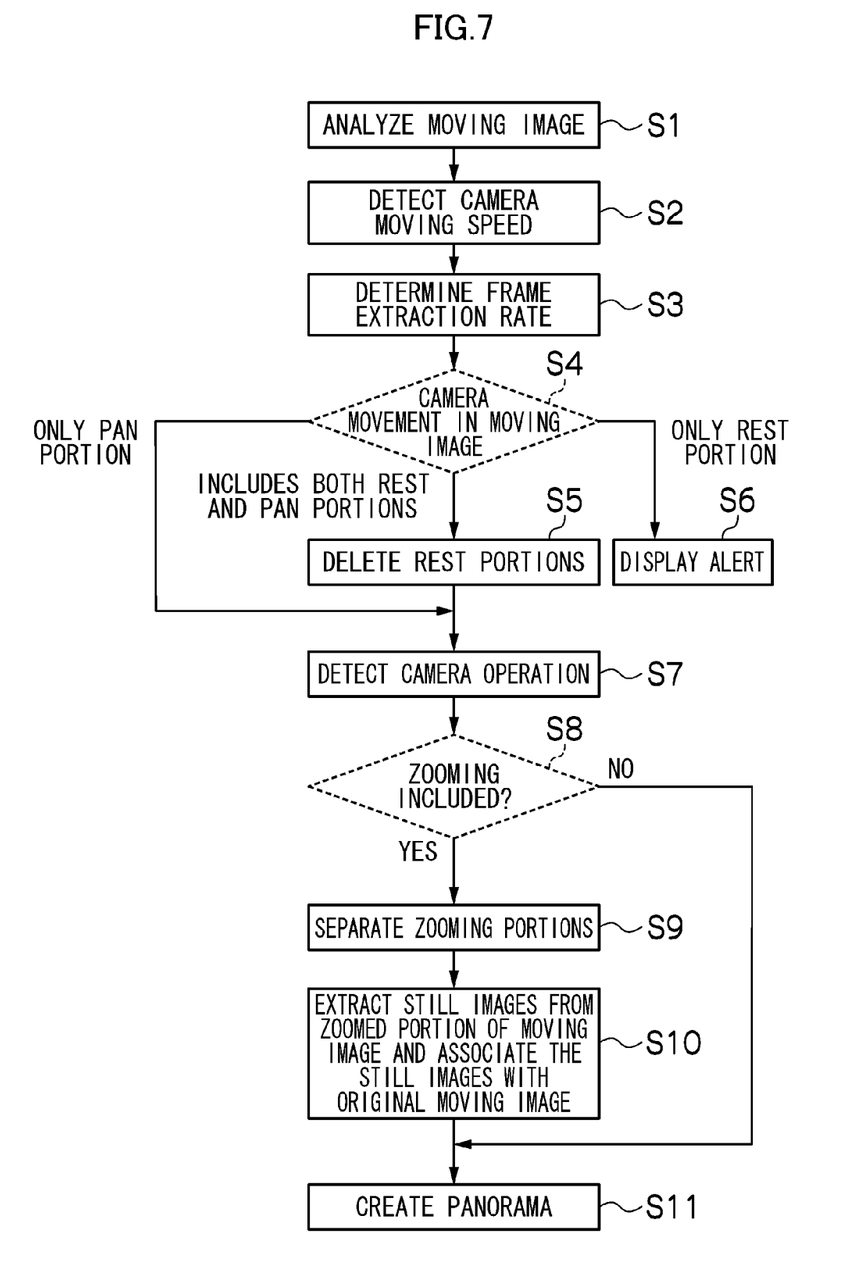
FIG. 7 is a flowchart of a panorama image creating process.

FIG. 7 shows a flowchart of a panorama image creating process executed by the panorama image creating apparatus 100. This process is controlled by the CPU 10. A program for causing the CPU 10 to execute the process is stored in the HDD 18 or other computer-readable storage medium. Various storage media such as CD, DVD, memory card and the like are available as the storage medium for storing the program. This process is started upon input of an instruction to create a panorama image from the operation unit 11.

At S1, the CPU 10 controls the still-image extracting unit 5 to extract frame images from a moving image input from the image input unit 1. Frame images extracted by the still-image extracting unit 5 according to the control are saved in the HDD 18 as material candidate images. The CPU 10 controls the camera-moving-speed analyzing unit 2, camera operation analyzing unit 3, and subject distance analyzing unit 4 to analyze the camera speed, camera moving direction, and subject distance at the image-taking time points of all or some of the material candidate images saved in the HDD 18 or at analysis time points, which are time points in the neighborhood of the image-taking time points. The analysis time points for camera movement by the camera-moving-speed analyzing unit 2, camera operation analyzing unit 3, and subject distance analyzing unit 4 may be the same as the image-taking time points of the material candidate images, but do not have to completely coincide with the image-taking time points of all the material candidate images. For example, these blocks may analyze the camera's moving speed, moving direction, zoom factor, and subject distance at predetermined multiple analysis time points (typically at predetermined time intervals from start of image taking to its end) prestored in the ROM 15 which are independent from the frame rate of the images.

At S2, the camera-moving-speed analyzing unit 2 detects camera speeds at predetermined analysis time points under control of the CPU 10. An illustrative result of this detection is shown in FIG. 4. In FIG. 4, movement analysis time points are points of time separated by an interval of one second from the start of image taking to its end. Of course, analysis time points are not limited to the illustrated one and may be defined at narrower or wider intervals.

At S3, the CPU 10 controls the panorama-image composition-range determining unit 6 to determine the number of material images to be extracted per unit time in the neighborhood of the movement analysis point for each material candidate image (a time interval including P1 or P2, e.g., one second around P1 and P2) based on the camera speed detected by the camera-moving-speed analyzing unit 2. Examples of the number of images to be extracted are shown above. From the material candidate images saved in the HDD 18, the CPU 10 extracts (or selects) material candidate images equal to the number of images to be extracted per unit time that has been determined within a time interval in the neighborhood of each point of movement analysis, designates the extracted material candidate images as material candidate images anew, and discards material candidate images that were not extracted from the HDD 18. As an example, five moving-image frames per second are extracted as material candidate images within a second around the point of movement analysis P1 in FIG. 4 and fifteen moving-image frames per second are extracted as material candidate images within a second around the point of movement analysis P2.

At S4, of the material candidate images in the HDD 18, the CPU 10 identifies rest-time images, which are material candidate images that were taken at an analysis time point when the camera speed detected by the camera-moving-speed analyzing unit 2 is below a predetermined value (alternatively a time point of image taking closest to such an analysis time point), and non-rest-time images which are the remaining material candidate images. If the CPU 10 does not determine that all the material candidate images are rest-time images, the flow proceeds to S5, and if the CPU 10 determines that all the material candidate images are rest-time images, the flow proceeds to S6.

At S5, the CPU 10 discards the rest-time images from the material candidate images in the HDD 18 and designates the other non-rest time images as material images.

At S6, the CPU 10 outputs a predefined alert to the display unit 12 or a speaker. An example contents of an alert output is as shown above.

At S7, the CPU 10 controls the camera operation analyzing unit 3 to obtain zoom information corresponding to each material image from supplementary information (such as a tag) of the image. The camera operation analyzing unit 3 obtains zoom information in response to the control.

At S8, the CPU 10 determines whether or not zoom information acquired by the camera operation analyzing unit 3 corresponding to one or more material images exceeds a zoom factor of 1:1. The flow proceeds to S9 if Yes and to S11 if No.

At S9, the CPU 10 extracts material images corresponding to zoom information exceeding a zoom factor of 1:1 from the HDD 18.

At S10, the CPU 10 excludes the material image extracted at S9 from material images, and designates the remaining material images anew as material images. Instead of discarding, the CPU 10 may save the moving-image frames excluded at S9 in the HDD 18 such that indication information indicative of their exclusion and other material images are associated with the frames. That is to say, the excluded moving-image frames are not suitable for use as materials for a panorama image as they are, but are worth keeping because they can be output as mere still images relevant to the panorama image.

At S11, the CPU 10 controls the panorama image compositing unit 8 to create a panorama image based on the material images in the HDD 18. In this process, enhancement as a function of the direction of image taking detected by the camera operation analyzing unit 4 may be effected by the enhancement processing unit 9. Examples of enhancement are illustrated in FIGS. 5 and 6.

What is claimed is:

1. A composite image creating method for causing an information processing apparatus to execute the steps of:
   inputting material candidate images which are images composed of frames of a moving image and/or a plurality of still images that were taken by an image-taking apparatus;
   detecting a movement of the image-taking apparatus at image-taking time points of all or some of the material candidate images or analysis time points that are time points in a neighborhood of the image-taking time points;
   determining a condition for generating a composite image from among the material candidate images based on the movement of the image-taking apparatus detected; and
   creating a composite image based on the material candidate images and on the condition determined;
   and further causing the information processing apparatus to execute the steps of:
   detecting a moving speed and/or a moving direction of the image-taking apparatus at the image-taking time point of each of the material candidate images;
   determining a material candidate image that is to be visually enhanced among the material candidate images based on the moving speed and/or the moving direction; and
   creating a composite image in which a subject contained in the material candidate image to be visually enhanced is visually enhanced based on the material candidate image;
   wherein the moving speed of the image-taking apparatus at the analysis time points of the material candidate images to be visually enhanced is slower than the moving speed of the image-taking apparatus at the analysis time points of other material candidate images.

2. The composite image creating method according to claim 1, causing the image processing apparatus to execute a step of excluding an image that was taken at an analysis time point at which the movement of the image-taking apparatus did not meet a predetermined criterion from material candidate images.

3. The composite image creating method according to claim 2, causing the information processing apparatus to execute the steps of:
   detecting a moving speed of the image-taking apparatus at each analysis time point;
   determining a number of material candidate images to be extracted per unit time in the neighborhood of the each analysis time point based on the detected moving speed of the image-taking apparatus at each analysis time point;
   extracting material candidate images as many as the number of images to be extracted per unit time in the neighborhood of the each analysis time point; and
   creating a composite image based on the material candidate images extracted.

4. The composite image creating method according to claim 1, causing the information processing apparatus to execute the steps of:
   detecting a moving speed of the image-taking apparatus at each analysis time point;
   determining a number of material candidate images to be extracted per unit time in the neighborhood of the each analysis time point based on the detected moving speed of the image-taking apparatus at each analysis time point;
   extracting material candidate images as many as the number of images to be extracted per unit time in the neighborhood of the each analysis time point; and
   creating a composite image based on the material candidate images extracted.

5. A non-transitory computer-readable medium encoded with a program for causing an information processing apparatus to execute the composite image creating method according to claim 1.

6. An information processing apparatus that executes the composite image creating method according to claim 1.

\* \* \* \* \*